July 19, 1932.  S. W. MANN  1,868,242
EMERGENCY SWITCH MECHANISM AND LIGHTING SYSTEM
Filed Sept. 5, 1928  3 Sheets-Sheet 1

INVENTOR
S. W. Mann
by W. T. Doolittle
Attorney.

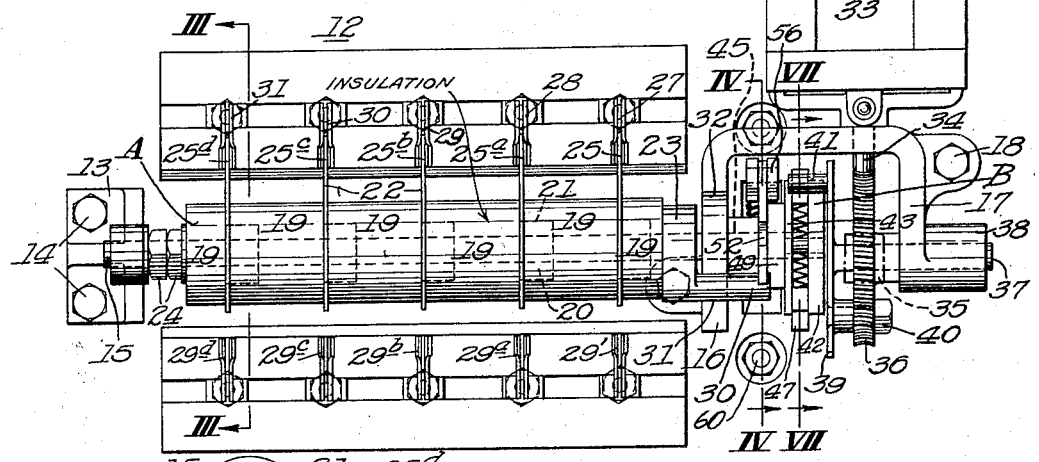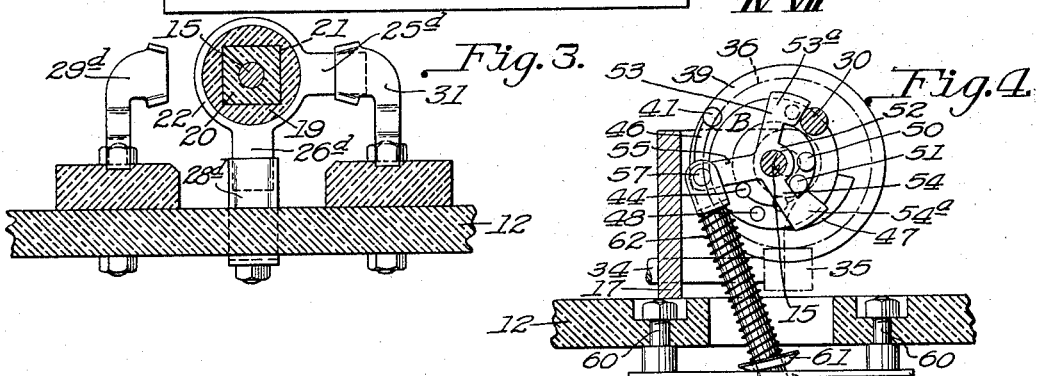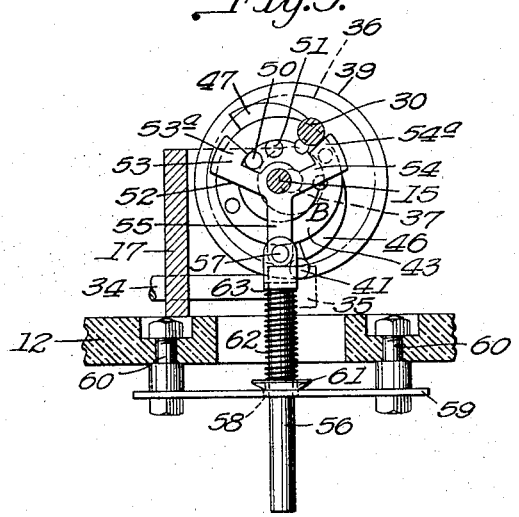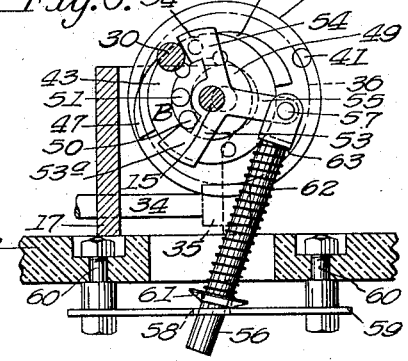

July 19, 1932.  S. W. MANN  1,868,242
EMERGENCY SWITCH MECHANISM AND LIGHTING SYSTEM
Filed Sept. 5, 1928   3 Sheets-Sheet 3
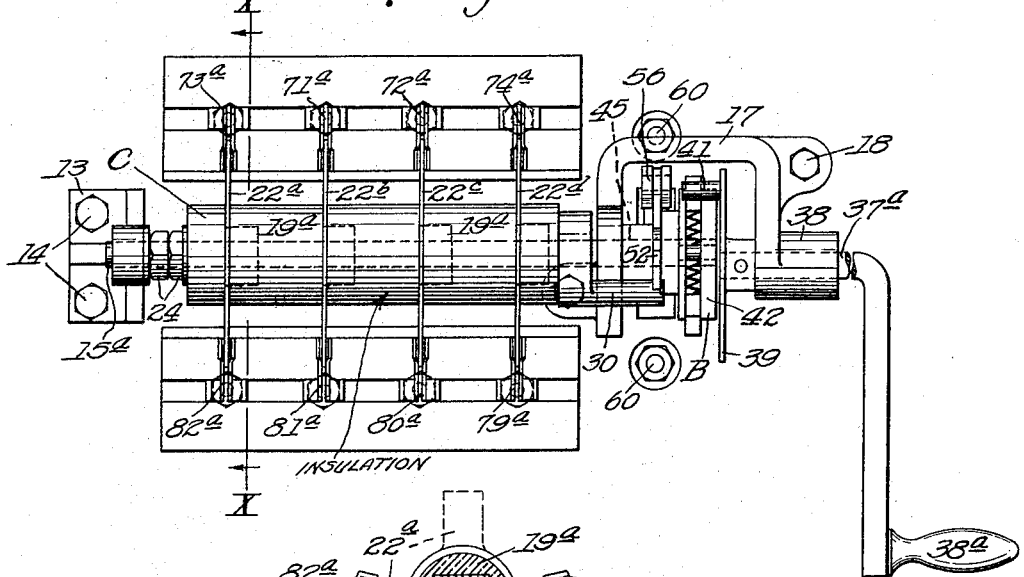
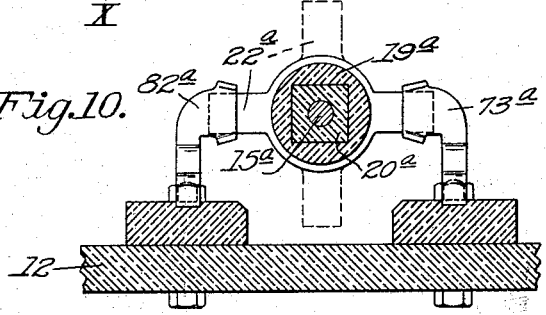
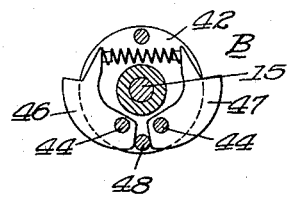
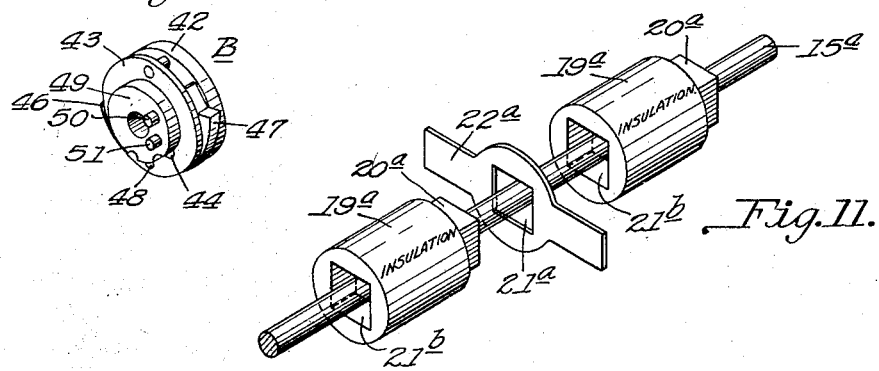
INVENTOR
S. W. Mann
by W. G. Doolittle
Attorney.

Patented July 19, 1932

1,868,242

UNITED STATES PATENT OFFICE

SEWARD W. MANN, OF PITTSBURGH, PENNSYLVANIA, ASSIGNOR TO FRANK B. SMITH, JR., OF PITTSBURGH, PENNSYLVANIA

EMERGENCY SWITCH MECHANISM AND LIGHTING SYSTEM

Application filed September 5, 1928. Serial No. 304,089.

This invention relates specifically to switch mechanism adapted for operation automatically in an electric circuit to cut a source of electric energy into the circuit when the normal source thereof fails, and to automatically restore the normal source into the circuit and cut out the second source when the normal source is restored to operative condition.

It is particularly aimed to provide a novel mechanism and system whereby an auxiliary source of electric energy may be thrown into a lighting circuit, for instance, as used at theatre exits, which will operate on slight wattage to materially simplify the system and mechanism required, and especially reduce the cost of such illumination.

A prime object is to provide such a motor-operated means for the switch mechanism in which the motor idles or coasts to a stop after throwing the switch, as compared with abrupt arrest of the motion of the motor.

Another object is to provide a novel mechanism which may be built for motor operation or for manual operation, and which includes novel inter-related loosely mounted parts for co-action with a switch member, and an element adapted to be moved relatively thereto.

Further, an object is to mount the aforesaid element on an axis eccentrically of the switch member, so that after the latter has been shifted the operating means will be ineffective and in the case of the motor will idle or coast until loss of its momentum.

Still another object is to provide a novel system having a motor operable from two sources of current and a novel relay with a core maintained retracted when current is used from one source and adapted to be released automatically upon failure of the latter source, in order to energize the system from the other source.

It is still further aimed to provide a novel, exceedingly strong, solid, and compact rotary switch assembly.

In addition, a further aim is to provide a novel structure in which the switch and improvements may be a unit manually operable from the exterior of the machine, and so constituted as to also serve as a substitute for the usual knife switch.

Additional objects and advantages will become apparent and in part be specifically pointed out in the following description taken in connection with the accompanying drawings, wherein:

Fig. 2 is a front elevation of the switch assembly and parts for its mounting;

Fig. 3 is a cross sectional view, taken on the line III—III of Fig. 2;

Fig. 4 is a cross sectional view, taken on line IV—IV of Fig. 2, showing the switch member in position maintaining an electric circuit through the lights or lamps from a source of direct current;

Fig. 5 is a view taken on the same plane as Fig. 4, but with the parts in dead center position about to shift from the relation of Fig. 4 to the opposite position where an electric current through the lamps or lights is maintained from a source of alternating current;

Fig. 6 is a view taken on the same plane as Figs. 4 and 5, and with the parts in a position reverse to Fig. 4 and to which they are shifted from the relation shown in Fig. 5;

Fig. 7 is a detail sectional view through the yoke-actuator, and taken on the plane of line VII—VII of Fig. 2;

Fig. 8 is a detail perspective view of said yoke-actuator alone;

Fig. 9 is a front elevation of a modified form of switch mechanism;

Fig. 10 is a cross sectional view taken on the plane of line X—X of Fig. 9; and

Fig. 11 is a detail perspective view showing elements of the switch device of Figs. 9 and 10 separated in order to disclose details.

Figure 1:
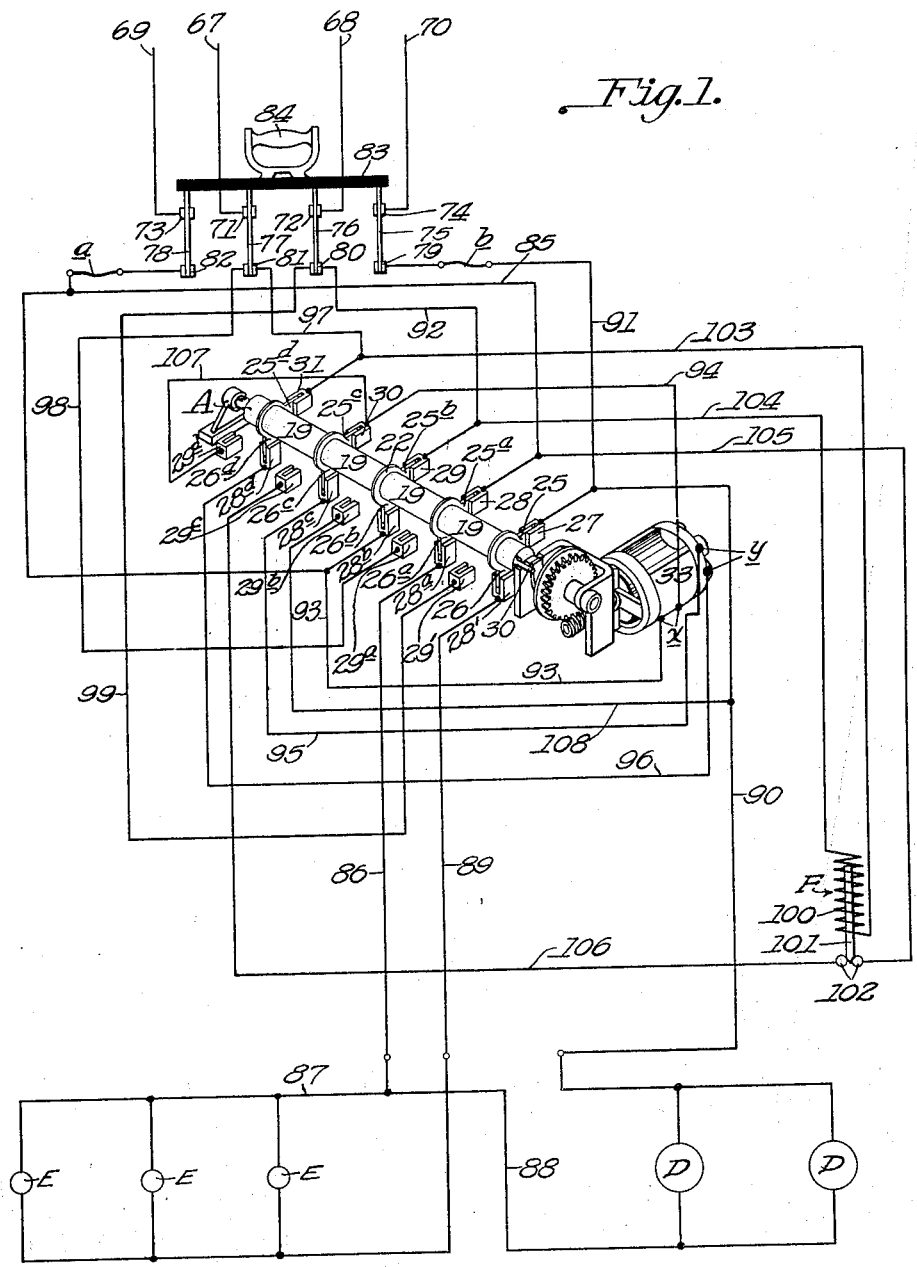
Fig. 1 is a view illustrating the system and mechanism in an electrical diagram.

In carrying out the invention, all of the parts are adapted to be carried by a panel 12, of suitable insulation, and which is usually vertically disposed and supported. A bearing 13 is bolted to said panel, as at 14, and has a shaft 15 journalled therein for rocking movement. Said shaft 15 is also rockably journalled in an arm 16 of a generally U-shaped bearing 17 bolted, as at 18, to said panel 12.

Said shaft 15 serves as a mounting for a rockable switch member generally designated A. Strung on said shaft 15 are a plurality of spools or cylinders 19 of insulation, which are interfitted by means of rectangular or other polygonal tenons 20, intimately engaging correspondingly shaped recesses 21. Switch blades 22, of suitable conducting material, have square openings therethrough, so that they may be non-rotatably fitted on to the tenons 20. When the spools 19 and blades 22 are in assembled relation, as shown in Fig. 2, the blades 22 are clamped and rigidly held between adjacent ends of said spools, and one of the outer spools 19 abuts a head 23 integral on the said shaft 15. Nuts 24 are threaded to the shaft and bear against the other outer spool 19. Said nuts 24 are located between the latter spool and the bearing 13.

Each of the blades 22 has two contacts thereon arranged ninety degrees apart. The contacts of the right hand blade 22 are designated 25 and 26. The corresponding contacts of the other blades 22 are respectively designated 25a, 25b, 25c, 25d, 26a, 26b, 26c and 26d.

Said contacts 25, 25a, 25b, 25c and 25d, in one position, as shown in Figs. 1 and 2, are adapted to engage stationary contacts 27, 28, 29, 30 and 31, and when the switch member A is rocked 90 degrees clockwise, the same contacts 25, 25a, 25b, 25c and 25d are respectively arranged to engage contacts 28', 28a, 28b, 28c and 28d. In the position shown in Figs. 1 and 2, the latter contacts 28', 28a, 28b, 28c and 28d are engaged by the contacts 26, 26a, 26b, 26c and 26d, but when the switch member A is rocked clockwise 90 degrees, in the manner previously mentioned, said contacts 26, 26a, 26b, 26c and 26d engage contacts 29', 29a, 29b, 29c and 29d, respectively.

The head 23 has an eccentric longitudinally extending lug 30 adapted for engagement with shoulders 31 and 32 to limit the movement of the switch member A to its two positions, said shoulders being provided on the arm 16.

The switch member A is adapted to be rocked or thrown from one position to the other and restored to its original position through the operation of an electric motor, as at 33, which may be mounted on said panel 12. The main shaft of said motor 33 is shown at 34, and has a worm 35 keyed thereon. Said worm is in mesh with a worm wheel 36 which is disposed on a shaft 37 journalled in a sleeve or arm 38 of the bearing or bracket 17. The axis of shaft 37 is offset or eccentric to that of shaft 15. Integral with the shaft 37 is a disk 39 which is rigidly bolted or otherwise secured in unitary relation with the worm wheel 36, as at 40. A longitudinally extending offset lug 41 is provided on the disk 39 at the opposite side thereof to the worm wheel 36.

Said lug 41 co-acts with a yoke-actuator B which is detailed in perspective in Fig. 8. Said actuator may consist of two disks 42 and 43 unitarily connected together and spaced apart by means of pins or rivets 44, and the disks 42 and 43 are loosely mounted on an extended portion 45 of shaft 15, located between the arm 16 and the disk 39.

The dogs or pawls 46 and 47, similar in construction, are disposed between the disks 42 and 43, and are pivotally mounted on adjacent pins 44, their outward movement being limited by abutment with a pin or lug 48 carried by the disk 43. An expansive coil spring is located between the disks 42 and 43, and bears at its terminals against the dogs or pawls 46 and 47, so as to urge them to projected position and permit retraction thereof to a position within the periphery of the disks 42 and 43. The disk 43 has an offset or enlargement at 49, from which two spaced pins 50 and 51 longitudinally project. Said lug 41 and pins 50 and 51 co-act with a switch-throwing yoke or actuator 52, which is loosely mounted on the shaft 15. Yoke 52 has spaced arms 53 and 54 respectively, adapted for engagement at their inner sides by the pins 50 and 51. If desired, a single projection may be used in place of pins 50 and 51.

The yoke 52 also has an arm at 55 to which a rod 56 is pivoted for movement on a horizontal axis, as at 57. Rod 56 passes loosely through an enlarged opening 58 in a bracket or plate 59 supported by bolts or the like at 60, on the panel 12. An abutment washer 61 is loose on the rod 56 and rests on the bracket 59 about the opening or hole 58. An expansive coil spring 62 surrounds the rod 56 and bears against the washer 61 and against a shoulder 63 provided on said rod 56.

When the switch member A is in the position shown in Figs. 1 and 2, the arm 30 is engaged by an enlargement 53a on the arm 53 of the yoke, thus holding the arm and switch against accidental displacement from such position, the rod 56 being inclined as shown in Fig. 4, with the spring 62 expanded and exerting its tension to hold said enlargement 53a in contact with arm 30. It will be noted that, in the position of Fig. 4, the lug 41 is in abutting relation with the projected end of the dog or pawl 46.

When the motor 33 rotates its shaft 34 clockwise, the gear 36 and disk 39 rotate to the left in Fig. 4, moving the pin 41 orbitally, which, due to its contact with the dog 46, shifts the yoke-actuating device accordingly, moving the pin 50 against the arm 53, which thus causes the arm 53 to move unitarily with the yoke-actuating device, moving such yoke 53 to a position where the pivot 57 and associated parts are first moved to the vertical or dead center position, as in Fig. 5, whereby the spring 62 is compressed and tensioned to the maximum, and then moving such pivot to the right of dead center relative to Fig. 5, whereupon the force of said tensioned spring 62 is expanded, and causes the arm 54 at an extension 54a to forcibly engage the arm 30 and to move it and associated parts to the position opposite to Fig. 4, as shown in Fig. 6. In such position, the rod 56 and pivot 57 and spring 62, abutting on the opposite side of vertical to Fig. 4, will maintain the parts therein, until directly opposite motion to that traced is imparted to the said parts, caused by operation of motor 33 in a counter clockwise direction opposite to that mentioned.

Particular attention is directed to the advantages and reasons for eccentrically mounting or offsetting the axis of shaft 37 with respect to that of the shaft or element 15. As such shaft 37 is moved through operation of motor 33, according to the direction of operation, the pin or lug 41 will engage the free end of one or the other of the dogs 46 and 47. If the orbital or planetary movement of pin 41 engages the dog 46, as shown in Fig. 4, it will have the result of turning the actuator B in an arc, during which the dog 46 will move bodily with the actuator to a position where it is completely out of the path of movement of pin 41, which will be at a location a little past that shown in Fig. 5. As a result, continued movement of the pin 41 in the same direction through continued operation of motor 33 will cause the pin 41 to engage and press the dog 47 inwardly, and thus will not further effect movement of said actuator B, but will be capable of continued or idling movement in a circular path until the movement of the motor shaft 34 ceases. Pin 41 thus moves the actuator past a dead center position, so that the yoke 52 and its rod 56 and spring 62 can also move past dead center or the position shown in Fig. 5, to the end that the compressed spring 62 will forcibly actuate the yoke into engagement with the arm 30 in order to shift the switch member A. The opposite movement of these parts takes place with pin 41 first abutting dog 47 and then slipping past dog 46, when the motor 33 is operated in the reverse direction, that is, from the other source of electric current.

It will be realized, therefore, that the motor 33 is capable of driving its shaft 34 in opposite directions. Said motor 33 is of the universal type, that is, adapted for operation from a source of alternating current to turn its shaft 34 in one direction and for operation from a source of direct current to turn said shaft 34 in the other direction. The disclosure of the motor 33, however, is to be construed broadly, since it may be of a type adapted to operate in each of two directions from alternating current or from direct current, with the brushes and fields of the particular motor involved appropriately electrically connected.

While the apparatus described is capable of general use, one specific example has been given in the wiring diagram of Fig. 1 to show its use in connection with theatre exit lighting, where E are exit lights and D are dome lights, and which lights or lamps D and E are normally adapted for energization from a source of alternating current, but are adapted for illumination during failure of the latter from a source of direct electric current.

It is customary to have both exit and dome lights operated from the same emergency circuit. When the usual power circuit is on, however, the exit lights only receive energy through the emergency switch and the dome lights are operated in a separate circuit.

To trace the circuit connections more specifically, feed lines from any suitable source of alternating current, such as from a city power house or the like, are shown at 67 and 68, while feed lines leading from any suitable source of direct electric current, for instance, storage batteries, are shown at 69 and 70. Said contacts 67, 68, 69 and 70 lead to contacts 71, 72, 73 and 74, with which blades 75, 76, 77 and 78 are adapted for engagement to electrically connect them respectively to contacts 79, 80, 81 and 82, to which they are preferably pivoted. All of the blades 75, 76, 77 and 78 are connected by a single switch arm 83 of suitable insulation and provided with a hand grip 84.

Assuming that the alternating current has failed, the switch will be in a position closing an electric circuit from a source of direct current by way of conductors 69 and 70, to the lamps D and E, the current flowing from contact 82, through fuse $a$ to conductor 85, contact 28, the associated blade 22 having contacts 25a and 26a, contact 28a, and conductor 86. Conductor 86 branches into conductor 87 feeding the lamps E, and conductor 88 for the lamps D. The circuit for lamps E returns through conductor 89, contact 28', the blade 22 having contacts 26 and 26, contact 27, and joins the return wire 90 from lamps D, forming conductor 91 which returns to the contact 79 through fuse $b$. This circuit maintains illumination in the said lamps until alternating current comes on through the lines 67 and 68.

When said alternating current occurs, a motor circuit will be set up through contact 80, conductor 92, contact 29, blade 22 having contacts 25b and 26b, contact 28b, conductor 93, field connections $x$ of motor 33, conductor 94, contact 30, blade 22 having contacts 25c and 26c, contact 28c, conductor 95, brush connections $y$ of motor 33, conductor 96, contact 28d, blade 22 having contacts 26d and 25d, contact 31, conductor 97 and contact 81. Said motor circuit will cause motor 33 and its mechanism to rotate switch A in a clockwise direction until contacts 25, 25a, 25b, 25c and 25d engage contacts 28', 28a, 28b, 28c and 28d, and contacts 26, 26a, 26b, 26c and 26d engage contacts 29′, 29a, 29b, 29c and 29d, respectively.

It will be seen that this rotation of switch A will break the alternating current circuit through motor 33, and the direct current circuit through the lamps D and E. At the same time, an alternating current circuit will be set up to light lamps E through contact 81, conductor 98, contact 29a, blade 22 having contacts 26a and 25a, contact 28a, conductor 86, conductor 87, through lamps E, conductor 89, contact 28′, blade 22 having contacts 25 and 26, contact 29′, conductor 99, and contact 80. The circuit through the dome lights D is broken, and they receive light from a separable alternating current circuit, not shown.

A solenoid relay F having a coil 100 and an armature 101 adapted to bridge contacts 102, is placed in a vertical position on the switch panel. The coil normally receives alternating current to retract armature 101 from the contacts 102, and upon failure of said current, the armature drops by gravity and bridges the contacts 102. Said armature is very light in weight, and through its use and associated parts, a great saving in the quantity of electric current required is effected, being, for example, one-tenth of a watt, as compared with from sixty to one hundred or more watts in present constructions and systems.

When switch A has been rotated as just described, branch 103 of conductor 97 and branch 104 of conductor 92 complete an alternating current circuit through the coil 100 to hold armature 101 in a retracted position out of contact with contacts 102.

Also, with the switch in this position, a direct current circuit is established to rotate the motor 33 in a reverse direction to that effected by the alternating current. Such circuit includes contact 82, fuse a, conductor 85, conductor 105, contacts 102, conductor 106, contact 29c, blade 22 having contacts 26c and 25c, contact 28c, conductor 95, brush connections y of motor 33, conductor 96, contact 28d, blade 22 having contacts 25d and 26d, contact 29d, conductor 107, contact 30, conductor 94, field connections x of motor 33, conductor 93, contact 28b, blade 22 having contacts 25b and 26b, contact 29b, conductor 108, conductor 90, conductor 91, fuse b, and contact 79.

The above circuit is open at the contacts 102 while alternating current is flowing. However, upon the failure of said current, the armature 101 will bridge the contacts 102, thereby completing the direct current circuit through motor 33, which will rotate switch A counter-clockwise until it assumes the position shown in Fig. 1, the lights D and E again receiving power from the direct current source 69, 70.

It is objectionable to operate a large knife blade switch such as that shown in the power lines of Fig. 1 by hand, because of the danger encountered from arcing. To eliminate this, I have modified my switch construction as shown in Figs. 9, 10 and 11, to enable manual operation thereof.

Referring to such modified form, shaft 37a therein corresponds to the shaft 37 of the previous form, and has a hand crank 38d connected thereto. Such hand crank 38d may be positioned outside a cover for the mechanism and may be swung in opposite directions in order to operate the shaft 37a in opposite directions and effect exactly the same results as the operation of shaft 37 in opposite directions through the movement of motor 33. It will be noted that similar mechanism is employed, omitting only the motor and its gearing.

The switch C in this form is identical with that at A in the previous form, except that a smaller number of blades at 22a, 22b, 22c and 22d are used. These blades correspond to those at 22 in the previous form, but have their contact arms arranged 180 degrees apart for engagement with co-acting contacts to control electric circuits in which they are adapted for connection. Such contacts include contacts 71a, 72a, 73a and 74a, and oppositely disposed contacts 81a, 80a, 82a and 79a.

Such blades 22a, 22b, 22c and 22d are held in position by exactly similar means as is used in the preceding form, namely, by means of spools 19a of insulation, having tenons 20a adapted to pass through openings 21a in said blades, and thence into sockets 21b in the opposite ends of the spools 19a.

The particular switch member A or C is very advantageous in that it is extremely sturdy, is non-shrinkable, and holds the parts together as a solid unit, notwithstanding long and severe usage. To this end, the spools 19 and 19a are made of micarta, and the tenons 20 and 20a intimately fit the openings 21 and 21b, respectively, and the recesses engaged thereby in the spools snugly, and at the zones of contact of the spools with the shaft 15 in the first form and shaft 15a in the modified form, at the zones of contact between the spools at the tenons and recesses, and at the zones of contact of the spools with the blades 22 and 22a, 22b, 22c and 22d, as the case may be, sodium silicate or water glass is used as an adhesive to provide a firm structure.

It will be understood that the switch A or C is to be considered broadly, and that the principles of the invention can also be applied to a rockable or equivalent element or shaft, whether or not it is used for a switch or for other purposes.

Various changes may be resorted to, provided they fall within the spirit and scope of the invention.

I claim:

1. In combination with means adapted to be turned, an electric motor, co-acting parts driven by said motor upon a fixed axis to effect such turning, one of said parts being eccentrically mounted with respect to said means to occupy a non-operating position relative to said means at the completion of the movement thereof, notwithstanding continued operation of said motor.

2. In combination with means adapted to be rocked, a shaft fixed against longitudinal movement and adapted for turning about a fixed axis, means operable through said turning of the shaft to impart the rocking movement to said means, said shaft being eccentrically mounted with respect to said second means to automatically become inoperative at the end of the rocking movement for the purpose of continuing such rocking movement.

3. In combination with an element to be turned, an actuating means therefor, a rotatable means upon a fixed axis engageable with said means through movement in opposite directions to shift said element, said second means being eccentrically mounted with respect to said first means whereby continuation of either operating movement of the second means will be independent of the element.

4. In combination with an element to be turned, a throwing member therefor, a spring device co-acting with said member and movable to and from positions on opposite sides of dead center, said spring device being under greatest tension at dead center, so that the spring device in moving from dead center to the positions mentioned will effect the turning of said element, an actuator to move said member and spring device, and means rotatable on a fixed axis to operate the actuator in opposite directions to cause the throwing of said element by the spring device and move the actuator to positions where it will be unaffected by said means during a continuation of an operating movement.

5. In combination with an element to be turned, a shaft adapted to be turned and mounted eccentrically with respect to said element, a lever means to throw said element, a spring device operatively associated with said lever means and movable to positions on opposite sides of dead center, said spring device being under tension at dead center so that movement past dead center will enable the spring to move the lever to shift said element, an actuator having means for engagement with said lever, a pin eccentric with respect to said shaft and movable thereby, said actuator having yieldable dogs adapted for engagement by said pin, one at a time, according to the direction of movement of the shaft, so that the pin because of the eccentric mounting of the shaft will impart movement to the actuator and will then move independently of the actuator.

6. In combination with an element to be turned, a throwing member therefor, an actuating member for said throwing member, said throwing member and actuating member being pivoted coaxially with said element and adapted for movements independently thereof, said throwing member having a spring device associated therewith and adapted to occupy positions on opposite sides of dead center, said spring device being under tension at dead center so that in moving past the same it will throw said element, said actuating device having yieldable dogs, a shaft journalled eccentrically with respect to said element, shifting member and actuating device, a pin engageable according to the direction of movement of the shaft to abut one of said dogs and thereby move the actuating device and thereupon move out of engagement with said dog and independently of both dogs.

7. In combination with an element to be turned having a lug eccentric with respect to its axis, a yoke between arms of which said lug is disposed, said yoke being journalled on said element, a spring device operatively connected with said yoke and adapted to occupy positions on each side of dead center, said spring device being tensioned at dead center so that in moving past the same it will impart movement to the yoke so that the latter will engage the lug and thereby shift the element, an actuating device journalled on said element and having means projecting between said arms of the yoke to move the latter beyond dead center, and means to operate said actuating device.

8. In combination with an element to be turned having a lug eccentric with respect to its axis, a yoke between arms of which said lug is disposed, said yoke being journalled on said element, a spring device operatively connected with said yoke and adapted to occupy positions on each side of dead center, said spring device being tensioned at dead center so that in moving past the same it will impart movement to the yoke so that the latter will engage the lug and thereby shift the element, an actuating device journalled on said element and having means projecting between said arms of the yoke to move the latter beyond dead center, and means to operate said actuating device and slip relatively to said actuating device after a throwing movement of said element.

9. In combination with an element to be turned having a lug eccentric with respect to its axis, a yoke between arms of which said lug is disposed, said yoke being journalled on said element, a spring device operatively connected with said yoke and adapted to occupy positions on each side of dead center, said spring device being tensioned at dead center so that in moving past the same it will impart movement to the yoke so that the latter will engage the lug and thereby shift the element, an actuating device journalled on said element and having means projecting between said arms of the yoke to move the latter beyond dead center, and means to operate said actuating device, consisting of a pin having a planetary movement from an axis eccentric to that of the element, said actuating device having dogs engageable by the pin to move the actuating device according to the direction of movement of the pin, said dogs being yieldable, whereby after disengagement of the pin with either of them, it will move in a path eccentric to the axis of the actuating device and displace the other dog to the end that continued movement of the pin will be independent of the element.

10. In combination with an element to be turned, a bearing having spaced first and second arms, said element being journalled in said first arm and projecting into the space between said arms, a lug rigid with said element eccentric with respect thereto and extending across said first arm, a yoke journalled on said element betwen said arms, said lug extending into the space of the yoke, a spring device connected with said yoke and movable to positions on opposite sides of dead center, said spring device being tensioned in its dead center position, whereby in moving past the same it will throw said yoke and accordingly cause throwing of said element, an actuating device between said arms and journalled on said element, said actuating device having projecting means extending into the space of the yoke for abutment with portions of the yoke, said actuating device having yieldable pawls, an operating shaft journalled in the second arm on an axis eccentric with respect to said element, a pin offset with respect to said operating shaft and rigid therewith adapted for coacting engagement with said dogs, according to the direction of turning of the operating shaft.

11. In combination with an element to be turned, a lug thereon, a yoke movable from the same axis as said element, said lug extending into the space of the yoke, a spring device connected to the yoke and movable to positions on opposite sides of dead center, said spring device being tensioned at dead center so that in moving past dead center it will throw the yoke for engagement thereof with said lug to move the element, an actuating device having means disposed in the space of the yoke and adapted for engagement with the latter by movement in opposite directions, said actuating device being journalled on an axis coincident with that of the element, yieldable dogs carried by the actuating device, an operating device journalled on an axis eccentric with respect to that of the element and engageable with the dogs according to the direction of operating movement in order to shift the actuating device and then move independently thereof, a motor means capable of operation in opposite directions, and an operative connection between said motor means and said operating device.

12. A switch member consisting of a conductor blade, spools between which said blade is positioned and held, one of said spools having a rectangular tenon projecting through the blade, the other spool having a rectangular recess receiving said tenon, means securing said spools and blade in tight relation, said spools being of micarta, and water glass at the zones of contact of the spools and blade and of the tenon and walls of the recess.

In testimony whereof I affix my signature.

SEWARD W. MANN.